United States Patent [19]
Evertowski et al.

[11] Patent Number: 5,881,992
[45] Date of Patent: Mar. 16, 1999

[54] MOTOR SHELL WITH MOUNTING TABS

[75] Inventors: Mark S. Evertowski, Florissant; Jason J. Hill, Manchester, both of Mo.

[73] Assignee: Emerson Electric Co., St. Louis, Mo.

[21] Appl. No.: 714,848

[22] Filed: Sep. 17, 1996

[51] Int. Cl.⁶ .................................................. F16M 1/00
[52] U.S. Cl. .......................... 248/674; 248/300; 248/671; 29/596; 72/325
[58] Field of Search .................... 248/300, 671, 248/674, 637, 229.17; 411/417, 418, 437; 29/596; 72/325

[56] References Cited

U.S. PATENT DOCUMENTS

| | | | |
|---|---|---|---|
| 1,175,802 | 3/1916 | Orcutt | 248/300 |
| 1,805,742 | 5/1931 | Reynolds | 248/300 |
| 2,896,887 | 7/1959 | Beltz | 248/300 |
| 2,908,965 | 10/1959 | Platt . | |
| 3,066,903 | 12/1962 | Tinnerman | 248/300 |
| 3,145,959 | 8/1964 | Langdon | 248/671 X |
| 3,145,960 | 8/1964 | Langdon | 248/671 X |
| 3,331,272 | 7/1967 | Hanneman | 411/437 X |
| 3,557,655 | 1/1971 | Coe . | |
| 4,361,953 | 12/1982 | Peachee . | |
| 4,666,055 | 5/1987 | Lewis . | |
| 4,842,437 | 6/1989 | Egner . | |
| 5,203,071 | 4/1993 | Niemela . | |
| 5,290,005 | 3/1994 | Akiyama | 248/671 |
| 5,391,837 | 2/1995 | Carey . | |
| 5,445,503 | 8/1995 | Kmiec et al. | 248/674 |

*Primary Examiner*—Peter M. Cuomo
*Assistant Examiner*—Anthony D. Barfield
*Attorney, Agent, or Firm*—Howell & Haferkamp, L.C.

[57] ABSTRACT

An apparatus and method are disclosed for attaching a capacitor cover or other enclosure to a motor shell without welding studs to the motor shell or drilling holes in the motor shell. The apparatus includes a motor shell having mounting tabs integrally formed from the frame band which forms the motor shell. The tabs can be formed by punching or cutting tabs in the frame band. The tabs can be configured for mating with apertures in the enclosure and can receive a threaded nut or can be bent or crimped to secure the enclosure in place. The method of attaching an enclosure to the motor shell comprises the steps of forming tabs from the frame band, inserting the tabs through apertures in the enclosure and bending, crimping or threading a nut on the tabs. In this manner, an enclosure can be attached to a motor shell without welding studs to the motor shell and without drilling holes in the motor shell.

20 Claims, 2 Drawing Sheets

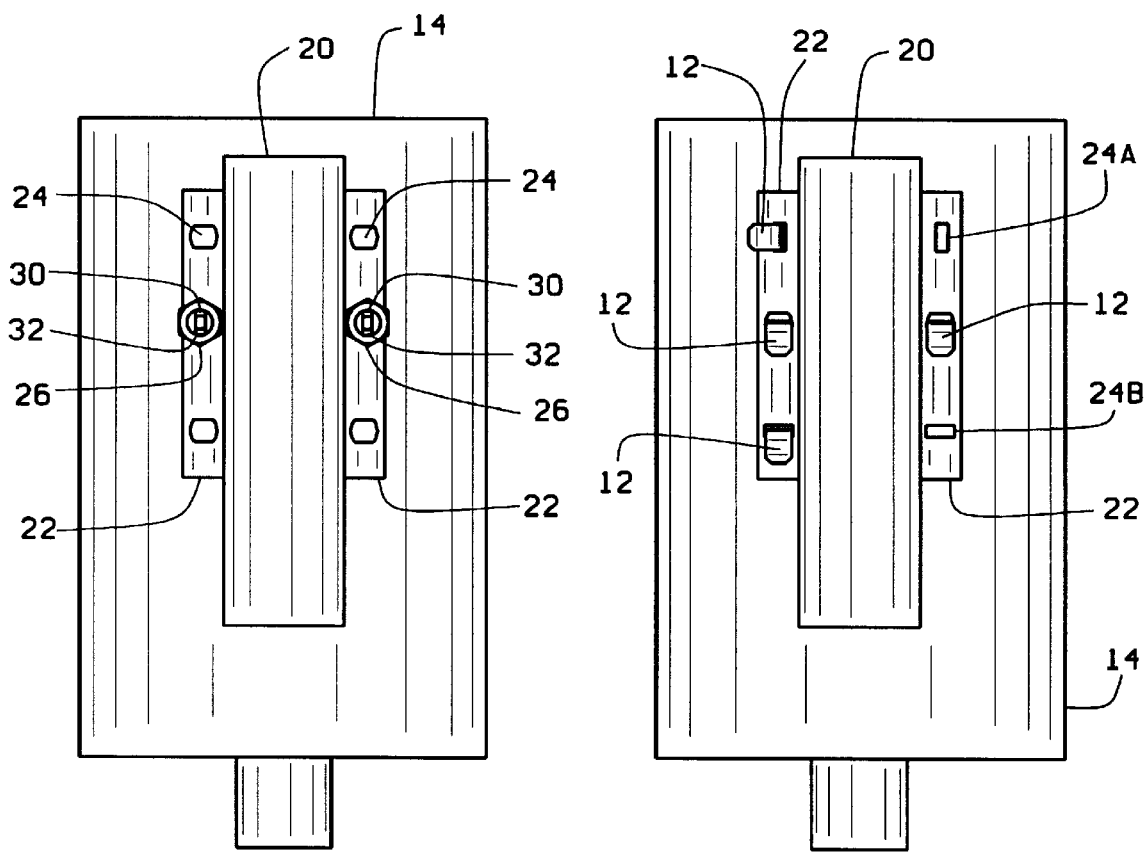
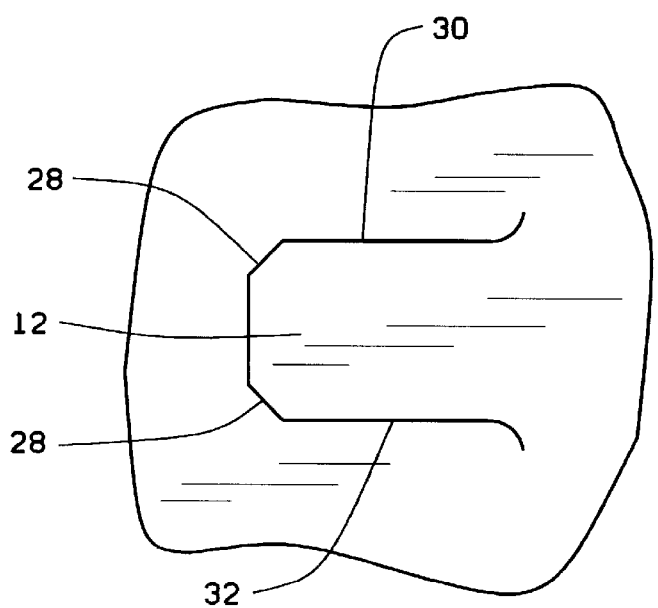

MOTOR SHELL WITH MOUNTING TABS

BACKGROUND OF THE INVENTION

(1) Field of the Invention

The present invention pertains to motor shells or motor housings having separate enclosures attached thereto. In particular, this invention relates to motor shells having mounting tabs for use in mounting a separate enclosure to the motor shell and to a method of mounting an enclosure to a motor shell using mounting tabs integrally formed from the same piece of material which forms the motor shell.

(2) Description of the Related Art

Electric motors are used in a vast number of applications for converting electrical energy into mechanical motion. It is well known in the art to encase an electric motor in a shell or housing to protect the internal components of the motor from physical damage or interference. In many instances, a capacitor or other element must be electrically connected to the electric motor to ensure optimum performance. In those instances, the electrical element is external to the motor shell and is encased in its own enclosure. However, because the motor and the external element are sold as a single unit, the enclosure which encases the external element is typically secured to the outer surface of the motor shell. For example, it is common for an electric motor to have a capacitor cover attached to the outer surface of the motor shell to protect and support a capacitor which is electrically connected to the electric motor.

A motor shell is usually formed from a rectangular piece of material known in the art as a frame band. The frame band is usually made of a metallic material and is rigid to provide protection to the internal motor and insulate the moving components of the motor from external interference. Frame bands can be manufactured in large quantities through well known manufacturing processes. After they are manufactured, frame bands are usually stored in large quantities until they are needed to form motor shells. Because the frame bands are flat, relatively thin pieces of material they can be stored by stacking one on top of another thereby allowing storage of numerous frame bands in less space than that needed for preformed motor shells.

When needed to manufacture motor shells, the frame bands are formed into a cylindrical shape by well known manufacturing processes and the ends of the rectangular bands are welded together. The interior of the motor shell is hollow to allow the placement of a motor, such as a stator and rotor assembly, therein. After the motor is inserted into the motor shell, end caps are usually placed on the ends of the motor shell to complete the assembly.

After completion of the motor shell assembly, it is usually necessary to electrically couple a capacitor or other external element to the electric motor to enhance the motor's operating characteristics. This is usually accomplished by attaching the element to electric leads from the motor which protrude through holes in one of the end caps or through openings in the motor shell. Because the external element is exterior to the motor shell, a separate enclosure is usually required to protect and support the external element. In addition, electrical motors are packaged and sold with the external element as one unit, therefore, it is common to secure the enclosure to the motor shell.

Unfortunately, prior art devices and methods used in attaching an enclosure to a motor shell are inefficient, costly, and require additional manufacturing process steps to prepare the motor shell for attachment of the enclosure. In addition, the additional manufacturing steps occasionally damage the internal workings of the electric motor. When such damage occurs, additional costs are incurred due to the time and manpower required to restore the motors to their original condition.

One prior art method which is used to prepare a motor shell for attachment to an enclosure is to weld threaded studs to the external surface of the motor shell. The threaded studs are usually welded onto the outer surface of the motor shell after the formation of the motor shell into its cylindrical shape from the frame band. This requires an additional manufacturing step which cannot be incorporated into the manufacturing process of the frame bands. If bolts or studs were attached to the frame bands during the manufacturing process, the ease with which the frame bands are stored is diminished. Furthermore, the location and size of the studs or holes are determined by the type and size of the enclosure. The studs provide a projection from the outer surface of the motor shell onto which the enclosure, such as a capacitor cover, can be secured. The enclosures have flanges with apertures therein for receiving the studs. Nuts are usually threaded onto the studs after the enclosure is installed on the studs to hold the enclosure firmly in place.

Another prior art method for attaching an enclosure to a motor shell is to drill holes into the motor shell which correspond to the apertures in the enclosure flanges. Self-tapping screws or bolts can then be used to secure the enclosure in place on the motor shell. The screws are inserted through the apertures in the enclosure flanges and into the drilled holes in the motor shell. Although drilling holes in the motor shell could be performed when manufacturing the frame band, it is common to delay the drilling until the motor shell is formed into the cylindrical shape and even after the stator assembly is inserted into the motor shell. This process accommodates the use of many different types and sizes of enclosures which may not be determined until after the type of motor is determined. For example, the same size frame band can be used for a variety of different types of motors. Although the motors may be of the same size and therefore fit into the same size motor shell, different characteristics of the motor may call for different external elements for the particular motor. Due to the different characteristics of the external elements, such as size and placement, different types and sizes of enclosures must be used. Therefore, by waiting until the motor is placed into the motor shell, one can then determine the type and size of the external enclosure which is required and thereby determine the location of the holes to be drilled. Because different sizes and types of external elements can be used with a particular motor shell, it is impractical to always manufacture the frame bands with predrilled holes for threaded fasteners therein because too many holes would have to be drilled to accommodate all of the different types and sizes of enclosures.

Unfortunately, drilling holes into the motor shell after the motor is placed therein may cause damage to the motor. For example, it is not uncommon for the drill to displace or damage the stator teeth. The displacement of the stator teeth forces the teeth into the central bore of the stator assembly where the teeth may strike the rotor. Because the space between the stator teeth and the external surface of the rotor is extremely small, any extension of the stator teeth into the central bore of the stator assembly could cause the motor to fail. When this occurs, alternative procedures are required to repair the damaged motor. One such process, known as rollerizing, adds additional steps in the manufacturing process thereby adding to the cost. In addition, the damage is sometime so extensive that even the additional procedures are incapable of adequately repairing the motor.

As discussed above, the prior art devices and methods are inefficient, costly and tend to damage the motors thereby requiring additional work and expense. What is needed is a device and method that allow quick, reliable attachment of an enclosure, such as a capacitor cover to a motor shell without the problems of the prior art. Such a device and method would preferably require little change to the existing manufacturing processes and procedures and accommodate various different types and sizes of enclosures. In addition, the method should facilitate the attachment of an enclosure to a motor shell without requiring drilling or welding and without damaging the internal workings of a motor.

SUMMARY OF THE INVENTION

The inventors herein have succeeded at meeting these and other needs by designing and developing an apparatus and method for attaching an enclosure to a motor shell in a secure, quick, and relatively inexpensive manner. The apparatus is configured to include a plurality of mounting tabs integrally formed from the motor shell. That is, the mounting tabs are formed from the frame band, which is the same piece of material which forms the motor shell. The mounting tabs project outwardly from the motor shell for insertion through the apertures in the flanges of an enclosure. In this manner, the enclosure can be conveniently attached to a motor shell without drilling holes into the motor shell and without welding studs to the motor shell.

In the preferred embodiment, the mounting tabs are integrally formed from the frame band by punching slits in the frame band which have a general U-shape. When the frame band is shaped into the cylindrical motor shell, the tabs can be bent to extend outwardly from the motor shell. The apertures in the enclosure flanges are aligned with the mounting tabs and the mounting tabs are inserted into the apertures. After insertion of the tabs into the apertures in the enclosure, nuts or other fasteners are threaded on the mounting tabs to secure the enclosure in place. The width of the tabs must be dimensioned so that they are self tapping as the threaded fasteners are screwed down over the tabs. In an alternative embodiment, the tabs can be bent down to contact the flanges after insertion through the apertures, thereby securing the enclosure in place without the need for nuts.

The mounting tabs can be punched or cut into the frame bands either at the time the frame bands are manufactured, or at any time thereafter, by any number of widely known methods. The shape and location of the mounting tabs can also vary depending on the type of enclosure and method of attachment required. Moreover, several different pairs of mounting tabs can be punched in different locations on the frame band to allow the attachment of different types and sizes of enclosures. Because only those mounting tabs which match the apertures in the particular enclosure to be attached need be used, the unused tabs remain flush with the motor shell and fulfill the function of protecting the motor. Therefore, numerous mounting tabs in alternative positions on the motor shell can be provided without diminishing the integrity or function of the motor shell thereby accommodating a wide variety of enclosures.

In accordance with the method provided by the present invention, an enclosure can be easily coupled to a motor shell, thereby forming a motor assembly, using the mounting tabs. The method comprises the steps of forming the tabs in the motor shell, bending the tabs to project from the motor shell and inserting the mounting tabs through apertures in the enclosure. The method also comprises the steps of securing the enclosure to the motor shell, either by bending the mounting tabs until they contact the enclosure flange or by threading nuts or other fasteners onto the mounting tabs. Thus, the apparatus and method of the present invention allow an enclosure to be quickly and easily attached to a motor shell without any need for welding studs, drilling holes and without any risk of damage to the motor assembly.

While the principal advantages and features of the present invention have been described above, a greater understanding of the invention may be attained by referring to the drawings and the detailed description of the preferred embodiment which follow.

BRIEF DESCRIPTION OF THE DRAWINGS

FIG. 4 is a side view of a capacitor cover attached a motor shell by the mounting tabs being inserted through the apertures in the capacitor cover with nuts threaded on the mounting tabs according to the present invention;

FIG. 5 is a side view of a capacitor cover attached to a motor shell by the mounting tabs being inserted through apertures in the flanges on the capacitor cover and bending the mounting tabs to contact the flanges according to the present invention; and FIG. 6 is an enlarged partial view of the frame band of FIG. 1 showing a close-up of a mounting tab of the present invention.

DETAILED DESCRIPTION OF THE PREFERRED EMBODIMENT

Figure 1:
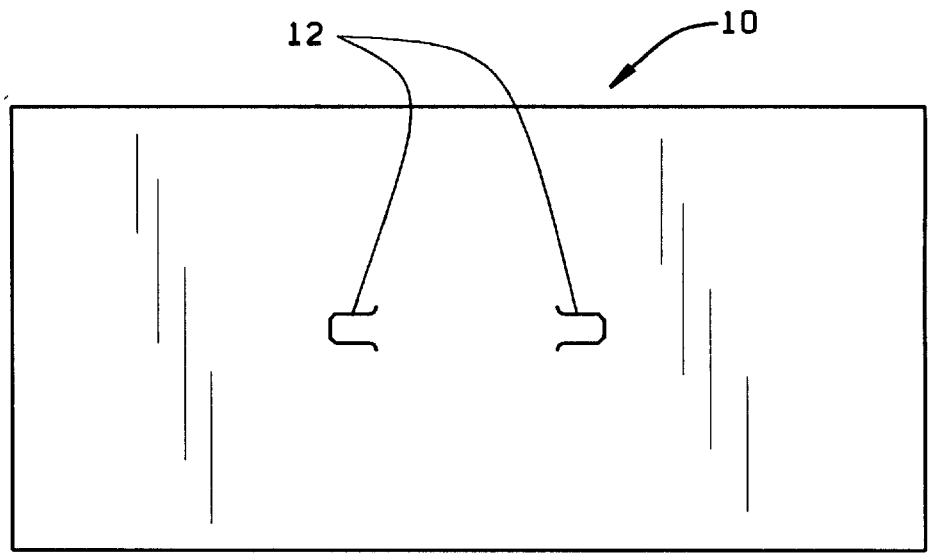
FIG. 1 is a top view of a frame band, having two mounting tabs punched therein, which is used to form the motor shell of the present invention.

A frame band modified in accordance with the principles of the present invention is shown generally as 10 in FIG. 1. As shown therein, the frame band 10 is a flat rectangular, relatively thin piece of material. As is known in the art, the frame band is usually made from a metallic material, however, any material which is acceptable for making motor shells is acceptable in the present invention. Because the mounting tabs 12 are formed from the same piece of material as the frame band and must be capable of being bent into a position substantially perpendicular to the motor shell, the frame band of the present invention should be made of a material which is rigid yet bendable. Thus, in the preferred embodiment, the frame band 10 is made from a metallic material, such as cold-rolled steel, which, although rigid, allows the mounting tabs to be bent into a position projecting outwardly from the motor shell for attachment of an enclosure thereon. In the frame band 10 of FIG. 1, two mounting tabs 12 are shown.

A frame band 10 which is used to form the motor shell 14 is shown to have two mounting tabs 12 punched therein. The mounting tabs 12 can be punched in any location on the frame band 10 in order to correspond to the appropriate apertures 24 in an enclosure, such as a capacitor cover 20 to be attached to the motor shell. Because the mounting tabs 12 need not be bent away from their first position, flush with the frame band 10, unless needed to protrude through an aperture 24 on an enclosure, a number of mounting tabs 12 can be punched for alternative attachment to various different types of enclosures or various different sized fasteners, and only those mounting tabs 12 which are necessary to attach a particular enclosure need be used. Because the mounting tabs 12 cause only a small slit to be formed in the motor shell 14, if a mounting tab 12 is not utilized with a particular enclosure, the motor shell 14 continues to function properly because the mounting tab continues to provide protection, unlike a hole drilled through the motor shell 14, which is more likely to allow dust or dirt to enter the motor shell and result in damage to the internal workings of the motor.

In the preferred embodiment, selected mounting tabs 12 are bent to project approximately 90° from the motor shell 14. However, different projections may be desired depending upon the size and shape of the aperture and the application for which the mounting tab is to be used. In addition, only the opposite outer two edges 30 and 32 of the mounting tab contact the fastener as the fastener is threaded. Therefore, the orientation of the mounting tab with respect to the motor shell can be rotated 360°. Any type of standard nut has been found to work adequately as long as the threads of the nut form complementary threads at the opposite edges 30 and 32 of the mounting tabs as the nuts are rotated onto the mounting tabs. In this manner, the mounting tabs function as screws or bolts projecting from the motor shell but are formed integrally with the motor shell. In addition, the mounting tabs can be any length so as to project from the motor shell any desired distance.

Figure 2:
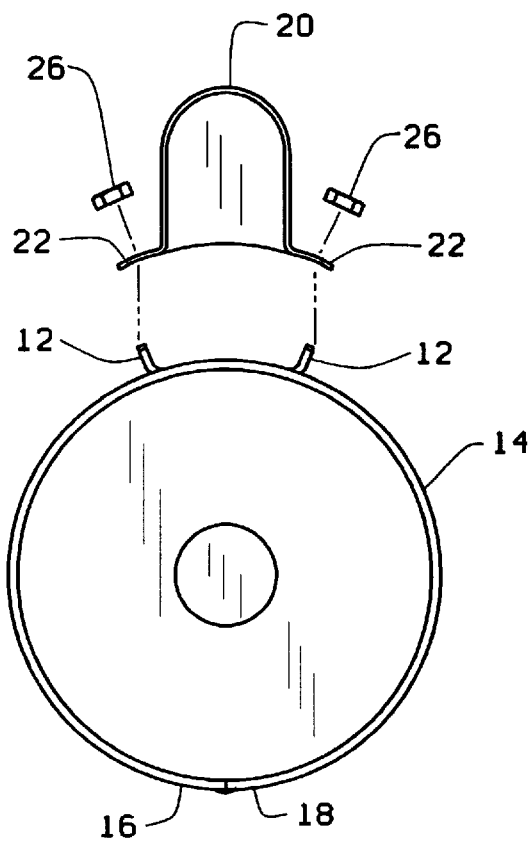
FIG. 2 is a top view of a motor shell, formed from the frame band of FIG. 1, with a capacitor cover positioned for attachment using mounting tabs and nuts according to the present invention.

A top view of the frame band formed into a cylindrical motor shell 14 is shown in FIG. 2. The motor shell 14 is formed from the frame band by reshaping the flat rectangular frame band 10 to form a cylinder and welding the frame band ends 16 and 18 together to hold the frame band 10 in the cylindrical formed motor shell 14. The mounting tabs 12 have been bent to project outwardly from the motor shell 14. Also shown in FIG. 2 is a capacitor cover 20 prior to attachment to the motor shell 14. The capacitor cover 20 has two flanges 22 each of which contains several apertures 24 for receiving the mounting tabs 12. Also shown in FIG. 2 are two nuts 26 which are positioned to be threaded onto the mounting tabs 12 to secure the capacitor cover 20 to the motor shell 14.

Figure 3:
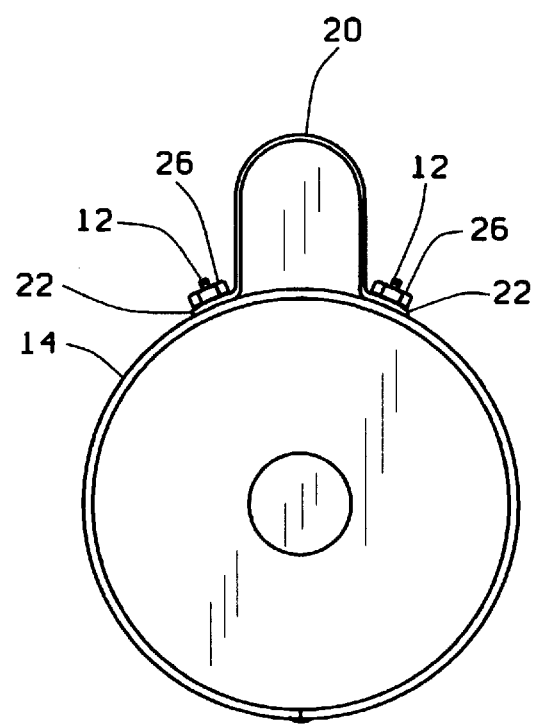
FIG. 3 is a top view of the motor shell of FIG. 2 with the mounting tabs inserted through the apertures in the flanges on the capacitor cover and nuts threaded on the mounting tabs according to the present invention.

As shown in FIG. 3, in attaching the cover 20 to the motor shell, the flanges 22 of cover 20 are positioned against the motor shell 14 with the mounting tabs 12 projecting through a pair of the flange apertures 24. The pair of nuts 26 are then screw threaded onto the mounting tabs, self tapping the opposite edges 30 and 32 (FIG. 4) of the tabs 12 to match the internal screw threading of the nut 26 and securing the capacitor cover 20 to the motor shell 14. The material from which the nuts are made can be any material which is hard enough to cut threads into the tab as the nut is screw threaded onto the tab. As known in the art, the interior nut diameter is defined by the threads on the interior surface of the nut. Referring to FIG. 3, the capacitor cover 20 is shown attached to the motor shell 14 with nuts 26 threaded onto both mounting tabs 12. FIG. 4 is a side view of the capacitor cover attached to the motor shell as depicted in FIG. 3. As shown in FIG. 4, the flanges 22 on the capacitor cover 20 contain several apertures 24. Any number of additional mounting tabs 12 could have been formed in the frame band to be inserted through the remaining apertures 24 on the capacitor cover 20 and secured by threaded fasteners if a more secure attachment is desired.

A close-up of one of the mounting tabs 12 of the preferred embodiment is shown in FIG. 6. To facilitate the threading of a nut 26 onto the mounting tabs 12, the mounting tabs 12 have one end 28 tapered. By shaping the mounting tabs 12 in this fashion, a fastener such as a nut can be easily threaded thereon. The particular size and shape of the mounting tabs 12 is not limited as depicted in FIG. 6. The size and shape of the tab can take any form provided the mounting tab 12 can be inserted through a slit or other aperture 24 in the enclosure. The width of each mounting tab is determined so that it corresponds or is substantially equal to the larger diameter across the interior of the nut.

An alternative embodiment is shown in FIG. 5 wherein the mounting tabs 12 are crimped or bent to contact the flanges 22 of the capacitor cover 20. In this fashion, no nuts are needed to secure the capacitor cover 20 to the motor shell 14. As shown in FIG. 5, the apertures 24A and 24B in the capacitor cover 20 can be configured in a slit-like fashion approximately the size of the thickness and width of the mounting tab 12 so as to more securely maintain the tabs therein. In addition, the apertures 24A and 24B can be oriented in various positions with respect to the flange 22.

The present invention can be used to attach any type of enclosure to a motor shell provided the enclosure has slits or other apertures through which the mounting tabs can be inserted. In a typical application, a capacitor cover is attached to a motor shell to provide support and protection for a capacitor electrically connected to the motor. Thus, while the apparatus and method of the present invention was described and depicted for coupling a capacitor cover to a motor shell, it should be understood that the invention is not so limited.

As shown above, the use of mounting tabs reduces the cost, by reducing the steps needed and materials and manpower required to prepare and attach enclosures to motor shells, and eliminates the need for drilling holes through the motor shell 14 which could cause damage to the internal workings of a motor. In addition, there is no need to weld a threaded stud onto the exterior of the motor shell 14 which would also increase the costs of manufacturing the motor. If a particular type nut is to be used, the cross-section of the mounting tab should be such that the nut forms complementary threads on the mounting tab as the nut is threaded onto the mounting tab to hold the capacitor cover securely in place.

There are various changes and modifications which may be made to the invention as would be apparent to those skilled in the art. For example, while the enclosure to which the present invention has been described is a capacitor cover, other enclosures can also be used such as conduit boxes or other enclosures attached to motor shells. However, these changes or modifications are included in the teaching of the disclosure, and it is intended that the invention be limited only by the scope of the claims appended hereto, and their equivalents.

What is claimed is:

1. A housing arrangement for an electric motor comprising:

a motor shell defining a primary chamber is adapted for substantially encasing an electric motor, the motor shell having at least one mounting tab; and an enclosure defining a secondary chamber, separate from the primary chamber, the enclosure adapted to substantially enclose electrical components that are adapted to be adjacent an exterior surface of the motor shell, the enclosure having at least one aperture sized to receive said at least one mounting tab therethrough;

wherein said motor shell and said at least one mounting tab are of a monolithic piece.

2. The housing arrangement of claim 1 wherein the mounting tab is bent over an edge of the aperture thereby securing the enclosure and the motor shell together.

3. The housing arrangement of claim 2 wherein the mounting tab has a cross-sectional dimension and the aperture in the enclosure is a slit substantially equal in size to the mounting tab cross-sectional dimension.

4. The housing arrangement of claim 1 further comprising a fastener threaded onto the mounting tab.

5. The housing arrangement of claim 4 wherein at least a portion of the mounting tab is tapered to facilitate mating the mounting tab with the fastener.

6. The housing arrangement of claim 1, wherein the mounting tab is configured for receiving a threaded nut thereon.

7. The housing arrangement of claim 1 wherein the mounting tab is formed from a substantially U-shaped slot cut in the motor shell, whereby the tab is then bent in a manner so that at least a distal end of the tab extends outwardly from the motor shell.

8. The housing arrangement of claim 1 wherein at least one edge of the mounting tab is tapered.

9. A housing arrangement for an electric motor comprising:
   a frame band adapted to form a motor shell in a manner for substantially encasing an electric motor, the motor shell defining a primary chamber the frame band having at least one mounting tab monolithically formed therewith, the mounting tab being bendable from a first position substantially flush with the frame band to a second position where the mounting tab projects from the frame band; and
   an enclosure defining a secondary chamber, separate from said primary chamber, the enclosure adapted to substantially enclose electrical components that are adapted to be adjacent an exterior surface of the motor shell, the enclosure having at least one aperture sized to receive the at least one mounting tab therethrough.

10. The housing arrangement of claim 9 wherein a distal end of the mounting tab is bent over an edge of the aperture in a manner to secure the enclosure and the motor shell to one another.

11. The housing arrangement of claim 9 wherein the mounting tab has a generally rectangular cross-section and wherein the aperture in the enclosure is sized and configured to receive the mounting tab.

12. The housing arrangement of claim 9 wherein the mounting tab has a generally rectangular cross-section and wherein the aperture in the enclosure is a slit substantially equal in size to the mounting tab cross-section.

13. The housing arrangement of claim 9 further comprising a fastener adapted to be threaded onto the mounting tab in a manner to secure the enclosure and the motor shell to one another.

14. The housing arrangement of claim 9 wherein at least a portion of the mounting tab is tapered to facilitate the threading of the fastener onto the mounting tab.

15. The housing arrangement of claim 9 wherein the mounting tab is formed from a substantially U-shaped slot in the motor shell, whereby the tab is then bent in a manner so that at least a distal end of the tab extends outwardly from the motor shell.

16. A housing arrangement for an electric motor comprising:
   a motor shell adapted for substantially encasing an electric motor, the motor shell having at least one mounting tab formed from a substantially U-shaped slot in the motor shell whereby the tab is then bent in a manner so that at least a distal end of the tab extends outwardly from the motor shell, the motor shell and the mounting tab being of a monolithic piece; and
   an enclosure having at least one aperture sized to receive said at least one mounting tab therethrough.

17. The housing arrangement of claim 16 wherein the enclosure is adapted to be mounted to an exterior surface of the motor shell in a manner to form a secondary chamber on the exterior surface of the motor shell.

18. The housing arrangement of claim 16 wherein the substantially U-shaped slot is cut into the motor shell.

19. The housing arrangement of claim 16 wherein a distal end of the mounting tab is bent over an edge of the aperture in a manner to secure the enclosure and the motor shell to one another.

20. The housing arrangement of claim 16 wherein the mounting tab has a generally rectangular cross-section and wherein the aperture in the enclosure is a slit substantially equal in size to the mounting tab cross-section.

* * * * *